United States Patent [19]
Goodridge

[11] 3,955,123
[45] May 4, 1976

[54] MULTIPLE COVER ARRANGEMENT FOR GROUPED METERING PANELBOARD

[75] Inventor: Lawrence Carvin Goodridge, Bristol, Conn.

[73] Assignee: General Electric Company, New York, N.Y.

[22] Filed: Sept. 30, 1974

[21] Appl. No.: 510,223

[52] U.S. Cl................................ 317/106; 317/107; 324/156; 312/223
[51] Int. Cl.² ........................................ H02B 9/00
[58] Field of Search .......... 317/104, 106, 107, 111, 317/112, 120; 324/110, 156, 158 R; 339/198 M; 312/223, 308, 257 A, 257 SM, 100, 107, 242; 174/66; 49/397, 398, 401, 402, 463, 464

[56] References Cited
UNITED STATES PATENTS

| | | | |
|---|---|---|---|
| 2,403,132 | 7/1946 | Sparkes et al. ..................... | 317/107 |
| 3,675,085 | 7/1972 | Stanback ............................ | 317/106 |
| 3,729,572 | 4/1973 | Helin .................................... | 174/66 |

Primary Examiner—Gerald P. Tolin
Attorney, Agent, or Firm—Robert A. Cahill; Walter C. Bernkopf; Frank L. Neuhauser

[57] ABSTRACT

An electrical service entrance panelboard includes a plurality of stacked meter sections to which individual access is afforded by a vertical array of front covers. Each junction of the covers for adjacent meter sections defines an opening in which the watthour meter of one section is mounted. The portions of each junction flanking the meter opening are shingled to render the panelboard raintight.

7 Claims, 3 Drawing Figures

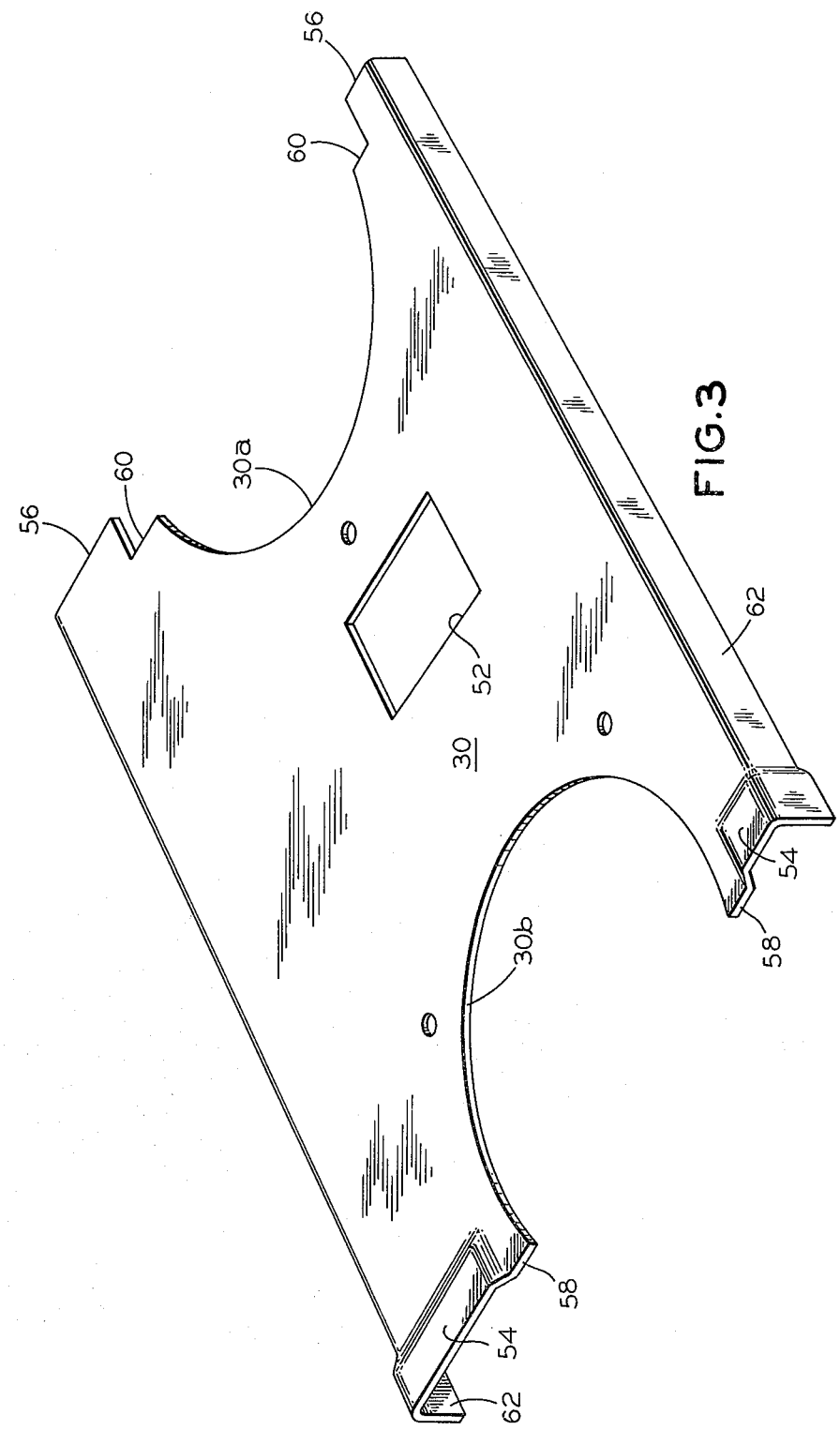

MULTIPLE COVER ARRANGEMENT FOR GROUPED METERING PANELBOARD

BACKGROUND OF THE INVENTION

Many situations arise where so-called "grouped metering" is resorted to. In multiple tenant buildings, for example, electrical power usage by the various tenants is typically separately metered for billing purposes. This requires a separate watthour meter for each tenant. For economy of installation and convenience in reading the plural meters, they are typically grouped together in one or more enclosures or panelboards adjacent the location of electrical service entry to the building. In some installations these panelboards are located outside the buildings, and thus must be weatherproof and most especially, raintight.

It has typically been the practice to design grouped metering panelboard enclosures to accommodate the plural watthour meters and associated electrical equipment as vertically arrayed meter sections. Access to these meter sections is afforded by a single full-height front cover. The cover is provided with vertically spaced openings to expose the meter socket of each meter section into which the watthour meter is plugged. Typically, the meters can be plugged in and out without having to remove the cover. This single full-height cover approach has the distinct disadvantage of exposing, upon removal of the cover, possibly live conductors in all of the meter sections, when access to only one section is desired by the electrician. The potential for personal injury under these circumstances is unnecessarily great.

To alleviate this potentially hazardous situation, grouped metering panels are being designed with plural front covers, one for each meter section. Thus, the cover to one meter section can be removed to provide access to the electrical equipment associated with that section. The other covers can remain in place to prevent inadvertent contact with live parts in the meter sections obscured thereby. The use of multiple front covers in lieu of a single full-height front cover makes weatherproofing of the panelboard enclosure more difficult. To make the enclosure raintight, the covers are typically "shingled", in that the lower edge of one cover overlaps the upper edge of the cover immediately below. Since, in existing designs, each cover is formed with a circular opening accommodating a watthour meter, removal of a cover with the meter in place requires considerable vertical separation between meter sections. This is due to the fact that the shingling precludes removal of the cover by simply pulling it forward, away from the panelboard. Sliding the cover downward to clear the overlapping edge of the cover immediately above is precluded by the interference of the upper half of the meter opening with either the meter or, depending on the design, the meter socket. Thus, successful removal of a single cover requires coordinated manipulations of swinging the bottom of the cover away from the panelboard about its upper edge while sliding the cover downwardly to clear the overlap with the cover above. With a meter in place, the radius of the arcuate movement of the lower half of the meter opening must be long so as to clear the front end of the meter. In other words, the spacing of the meter opening relative to the upper edge of the cover must be greater than is otherwise necessary if the cover is to be readily removable. As a consequence, grouped metering panelboards having multiple front covers have been considerably larger in size, particularly in height, than is necessary to accommodate the equipment for which it is designed. This limits the number of meter sections that can be stacked in a single panelboard vertical section. In larger installations, additional floor space for panelboard sections is required, something that may not be readily available. Moreover, this increased size contributes significantly to higher materials and fabricating costs.

It is accordingly an object of the present invention to provide an improved grouped metering panelboard.

An additional object is to provide a panelboard of the above character having stacked meter sections individually accessible through separate front covers.

Still another object of the invention is to provide a grouped metering panelboard of the above character which is smaller in size than prior art designs.

A further object is to provide a grouped metering panelboard of the above character which is efficient and economical in design and conveniently serviceable by electricians in relative safety.

Other objects of the invention will become apparent from the detailed description to follow.

SUMMARY OF THE INVENTION

In accordance with the present invention there is provided a grouped metering panelboard accommodating a plurality of watthour meter sections in stacked relation. The meter sections are individually accessible through a vertical array of front covers which are separately removable. Thus, removal of one cover to access a particular section for servicing does not expose the electrician to live parts in the other sections. To facilitate cover removal while affording a more compact design, the junction between adjacent covers defines the opening in which a watthour meter is accommodated. That is, the bottom edge of one cover and the upper edge of the cover immediately below are provided with complementary, semi-circular reliefs such that, when juxtaposed, a circular opening is created to accommodate the watthour meter or a protruding meter socket, depending on the panelboard design. The portions of the lower edge of each cover flanking the semi-circular relief are offset forwardly to overlap the portions of the upper edge of the cover below flanking its semi-circular relief. This shingling coupled with the inclusion of gasketing about each meter opening renders the grouped metering panelboard of the present invention raintight. Inasmuch as each meter opening is not completely bounded by one cover, the removal of a cover is not impeded by the presence of a forwardly protruding watthour meter. Consequently, the vertical spacing between watthour meters can be materially reduced, despite the shingled junctions between covers.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in conjunction with the accompanying drawing; in which:

FIG. 3 is a perspective view of one of the intermediate front covers for the panelboard of FIG. 1.

Like reference numerals refer to corresponding parts throughout the several views of the drawing.

DETAILED DESCRIPTION

Figure 1:
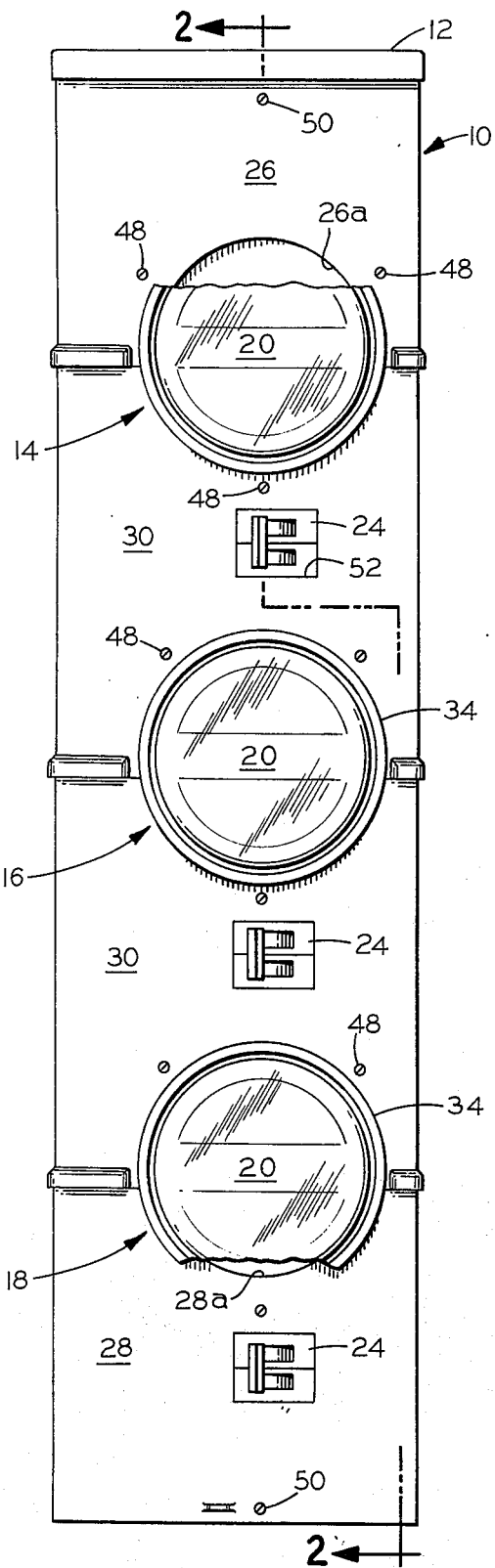
FIG. 1 is a front elevational view of a grouped metering panelboard constructed in accordance with an embodiment of the invention.

The grouped metering panelboard of the present invention, generally indicated at 10 in FIG. 1, includes an upright, vertically elongated enclosure 12 of generally box-shaped construction for housing stacked watt-hour meter sections, generally indicated at 14, 16 and 18. While three meter sections are shown, it will be appreciated that the present invention has utility in grouped metering panelboards having any number of plural, stacked meter sections. Each meter section includes, among other things, a watthour meter 20 accommodated in a meter socket, generally indicated at 22 in FIG. 2, current carrying busbars (not shown) and typically a two-pole circuit protective device 24, for example, a circuit breaker, connected in the branch distribution circuit metered by the watthour meter.

Figure 2:
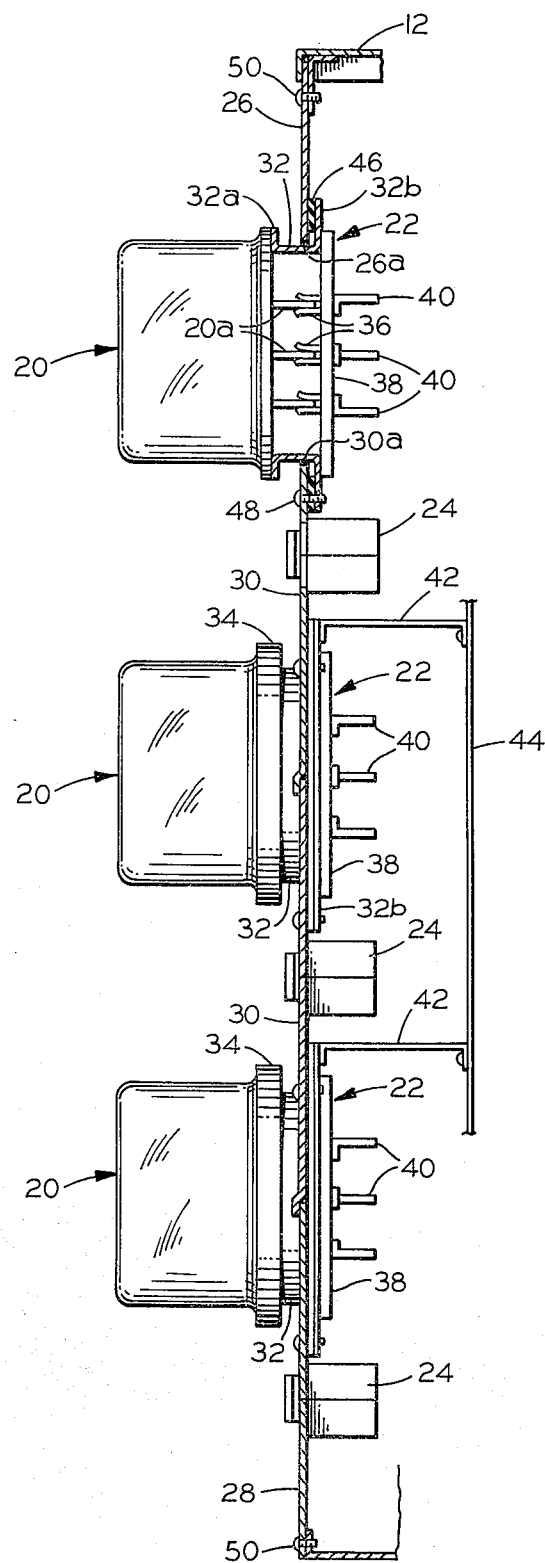
FIG. 2 is a sectional view, partially broken away, taken along line 2—2 of FIG. 1.

Panelboard 10 further includes, in accordance with the invention, a plurality of covers separately mounted to the open front of the enclosure 12 and individually removable to access a particular meter section. Specifically, the panelboard includes an upper front cover 26, a lower front cover 28 and a pair of intermediate front covers 30, all mounted to the enclosure in a vertical array. As a signal feature of the invention, the openings in the front cover array affording access to the meter sockets 22 for meters 20 are incorporated in the junctions between covers. Thus, as seen in FIGS. 1 and 2, the lower edge of upper cover 26 is formed with a semi-circular relief 30a (FIG. 3) formed in the upper edge of the intermediate cover 30 immediately therebelow to define a circular opening accommodating a collar 32 of the upper meter socket 22. Similarly, the upper edge of lower cover 28 is formed with a semicircular relief 28a which cooperates with a complementary semi-circular relief 28a which cooperates with a complementary semi-circular relief 30b (FIG. 3) formed in the lower edge of the lower intermediate cover 30 to define a circular opening accommodating collar 32 of the bottom meter socket 22. The junction between the two intermediate covers 30 incorporates a circular opening, as defined by the complementary semi-circular reliefs 30a and 30b formed therein to accommodate collar 32 of the middle meter socket 22.

As best seen in FIG. 2, the forward end of collar 32 of each meter socket 22 beyond the front cover array terminates in an annular shoulder 32a to provide an external seat for the base of a watthour meter 20. A locking ring 34 engages shoulder 32a and the meter base to retain the meter in place, as is conventional practice. It is thus seen that the meters 20 may be installed and removed with the front covers in place. Stab terminals 20a are engaged by connector jaws 36 mounted by a socket base 38 to electrically connect, via straps 40, the meter into the distribution circuit to be metered.

The inner end portion of each socket collar 32 is turned radially outward to provide an annular flange 32b. Brackets 42 mount the collars 32 to panelboard support structure 44. An annular gasket 46 is cemented to the flange 32b of each collar in circumscribing relation to each meter socket opening in the front cover array. Screws 48 clamp the covers to the collar flanges 32b, compressing gaskets 46 to prevent the entry of water, dust, etc., between the covers and socket collars while retaining the covers in place. Additional screws 50 engage structure of enclosure 12 to additionally secure upper cover 26 and lower cover 28 in place. The lower cover and the two intermediate covers 30 are also provided with apertures 52 exposing the circuit breakers 24 for manual operation without having to remove the covers.

To further insure the raintight quality of the grouped metering panelboard of the present invention, the junctions of the covers on each side of the meter socket openings are shingled to prevent the entry of water, even in a driving rain. To this end, as seen in FIG. 3 for covers 30, lower edge portions of the upper three covers to each side of the semi-circular reliefs therein are offset outwardly from the plane of the cover to provide flanges 54 which overlap vertically aligned upper edge portions 57 of the cover immediately below. Short edge segments 58 in the plane of the cover separate flanges 54 from the semi-circular edge reliefs so as to maintain gasketing continuity about the meter socket openings. To accommodate edge segments 58, the upper edges of the bottom three covers are notched, as indicated at 60 for the covers 30 in FIG. 3. Thus, with the flanges 54 overlapping the edge portions 56, the edge segments 58 fit into notches 60 to maintain essentially continuous pressure on gaskets 46 about the meter socket openings.

As best seen in FIG. 3, covers 30, as well as covers 26 and 28, are provided with short sidewalls 62 which overlap the front edges of the enclosure sidewalls. Flanges 54 are continued around the corners into these sidewalls so as to overlap the upper sidewall edge portions of the cover immediately below.

From the foregoing description, it will be appreciated that the incorporation of the meter socket openings in the junctions of vertically adjacent front covers, rather than wholly within the covers, provides a more compact panelboard construction with the vertical separation between meter sockets materially reduced. Since removal of one cover of a shingled vertical array does not require having to swing the bottom edge of a socket opening past an in-place meter, in clearing the overlapping edge of the cover above, the height of each cover can be made shorter, hence the separation between meter sockets decreased. It is seen that the edge of relief 30b, for example, need only swing clear of the meter locking ring as the upper edge portions 56 are cleared from under flanges 54; an arcuate movement of considerably less radius than would be required to swing the lower edge of a socket opening past an in-place watthour meter.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A grouped metering panelboard comprising in combination:

A. an upright, vertically elongated enclosure;

B. a plurality of vertically stacked meter sections accommodated in said enclosure, each said meter section including a meter socket means; and C. a vertical array of front covers, separately, removably mounted to said enclosure, the junctions between vertically adjacent covers being horizontally aligned with said socket means of said meter sections, each said junction including means forming complementary semi-circular reliefs in the lower edge of one cover and the upper edge of the cover immediately below, such that, when vertically juxtaposed, said junction therebetween incorporates a circular opening in registry with said socket means horizontally aligned therewith.

2. The grouped metering panelboard defined in claim 1, wherein a lower edge portion of said one cover flanking said relief therein overlaps a corresponding upper edge portion of said cover immediately therebelow.

3. The grouped metering panelboard defined in claim 2, which further includes gasketing means interposed between each said opening defining means and said socket means.

4. The grouped metering panelboard defined in claim 1, wherein each said meter section includes a circuit protective device, and said each said cover accessing each said meter section including means forming an aperture exposing said circuit protective device.

5. The grouped metering panelboard defined in claim 1, wherein the lower edge portions of said one cover to each side of said relief therein are forwardly offset so as to overlap aligned upper edge portions of said cover immediately therebelow.

6. The grouped metering panelboard defined in claim 5, wherein said one cover includes a lower edge segment lying in the cover plane and separating each offset edge portion from said relief therein and means forming notches in said upper edge of said cover immediately therebelow accommodating said lower edge segments of said one cover, said panelboard further including gasketing means interposed between said socket means and said covers about said complementary reliefs therein.

7. The grouped metering panelboard defined in claim 5, wherein each said cover includes short sidewalls overlapping front edge portions of sidewalls of said enclosure, said offset of said lower edge portions of said one cover extending through the lower edges of said cover sidewalls, whereby said cover sidewall offset lower edges overlap the upper sidewall edges of said cover immediately therebelow.

* * * * *